(12) United States Patent
Rebryna et al.

(10) Patent No.: US 8,535,425 B2
(45) Date of Patent: Sep. 17, 2013

(54) SEPARATION AND SCRUBBING SYSTEM FOR EXHAUST GASES

(76) Inventors: Quinn D. Rebryna, Lacombe (CA); Ron E. Cookson, Killam (CA)

( * ) Notice: Subject to any disclaimer, the term of this patent is extended or adjusted under 35 U.S.C. 154(b) by 317 days.

(21) Appl. No.: 12/994,441

(22) PCT Filed: May 22, 2009

(86) PCT No.: PCT/CA2009/000714
§ 371 (c)(1),
(2), (4) Date: Mar. 7, 2011

(87) PCT Pub. No.: WO2009/140771
PCT Pub. Date: Nov. 26, 2009

(65) Prior Publication Data
US 2011/0159574 A1 Jun. 30, 2011

Related U.S. Application Data

(60) Provisional application No. 61/055,506, filed on May 23, 2008.

(51) Int. Cl.
*B01D 53/14* (2006.01)
(52) U.S. Cl.
USPC .............. 96/224; 96/243; 96/262; 96/263; 95/223; 95/230; 95/235; 95/236; 435/266
(58) Field of Classification Search
None
See application file for complete search history.

(56) References Cited

U.S. PATENT DOCUMENTS

| | | | | |
|---|---|---|---|---|
| 4,080,428 A | * | 3/1978 | Holter et al. | 423/243.1 |
| RE29,941 E | * | 3/1979 | Bird | 95/11 |
| 5,407,646 A | * | 4/1995 | Smith et al. | 422/168 |
| 5,698,012 A | * | 12/1997 | Yoshikawa | 96/47 |
| 6,083,740 A | * | 7/2000 | Kodo et al. | 435/266 |
| 6,301,879 B1 | * | 10/2001 | Weisweiler et al. | 60/274 |
| 6,936,231 B2 | * | 8/2005 | Duncan et al. | 423/235 |
| 7,022,296 B1 | * | 4/2006 | Khang et al. | 423/210 |
| 7,438,879 B2 | * | 10/2008 | Risse et al. | 423/243.01 |
| 7,691,182 B1 | * | 4/2010 | Muradov et al. | 95/96 |
| 8,349,055 B2 | * | 1/2013 | Kaisko et al. | 95/149 |
| 2004/0247509 A1 | * | 12/2004 | Newby | 423/240 S |
| 2007/0134147 A1 | * | 6/2007 | Graville | 423/242.1 |
| 2008/0311640 A1 | * | 12/2008 | Cox et al. | 435/168 |
| 2009/0205492 A1 | * | 8/2009 | Andrus et al. | 95/109 |
| 2010/0040524 A1 | * | 2/2010 | Furnary et al. | 423/235 |
| 2011/0005391 A1 | * | 1/2011 | Cho et al. | 95/97 |
| 2011/0020916 A1 | * | 1/2011 | Koch et al. | 435/266 |
| 2011/0023712 A1 | * | 2/2011 | Rarig et al. | 95/100 |
| 2011/0146281 A1 | * | 6/2011 | Lackner et al. | 60/685 |
| 2012/0288428 A1 | * | 11/2012 | Comrie | 423/219 |

* cited by examiner

*Primary Examiner* — Duane Smith
*Assistant Examiner* — Pankti Patel

(57) ABSTRACT

A separation and scrubbing system for exhaust gases includes a plurality of industrial discharge outlets, a separation unit, pipelines to direct exhaust gases from the industrial discharge outlets to the separation unit and pipelines to return treated exhaust gases to stacks corresponding to the industrial discharge outlets.

10 Claims, 8 Drawing Sheets

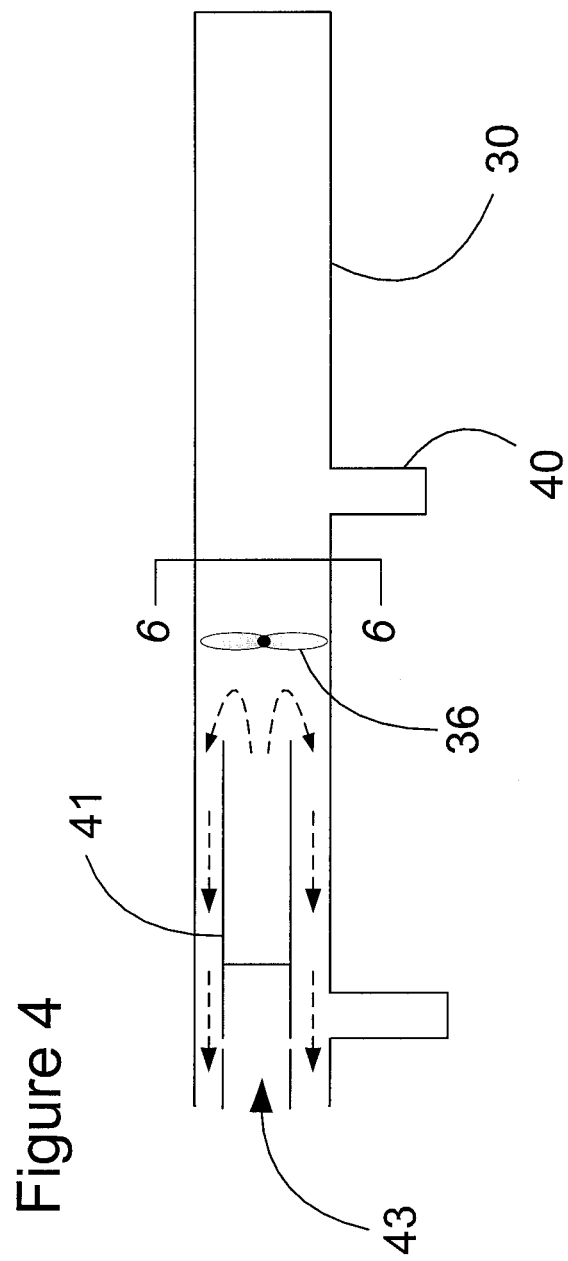

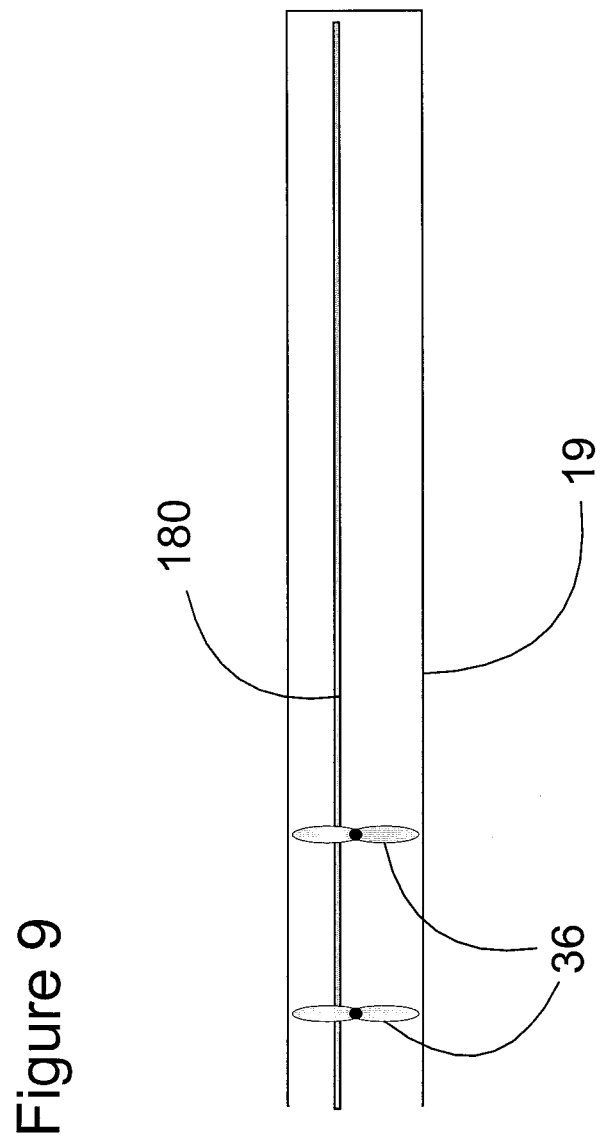

US 8,535,425 B2

SEPARATION AND SCRUBBING SYSTEM FOR EXHAUST GASES

TECHNICAL FIELD

The present invention relates to separation and scrubbing systems for exhaust gas streams and for geologically stored $CO_2$.

BACKGROUND

Recently, individuals, industry and government have been increasing their efforts to reduce harmful gas emissions into the atmosphere. Some industrial plants currently employ environmentally responsible practices including the treatment of emissions containing $CO_2$, $NO_x$, $SO_2$ and sub micro particles. In these plants, emission treatment is generally performed on-site, at the exhaust gas outlet location. The treatment generally includes the separation and sequestration of $CO_2$ and other gases.

Often, the components of an exhaust gas treatment system are situated upstream of a large vertical stack through which the exhaust gas passes before being released into the atmosphere. One drawback to this arrangement is that if system maintenance is required, the exhaust gas must either be diverted to another outlet location or the plant must be shut down in order to allow for the maintenance to be performed. Furthermore, significant costs are required for retrofitting existing facilities to upgrade separation. Another drawback is that none of the current systems are designed for high-pressure capture and sequestration of the individual gases comprising the exhaust gas streams, e.g., $CO_2$ for geosequestration.

SUMMARY

In a first aspect of the present invention there is provided a separation and scrubbing system including: a first pipeline provided between a first exhaust gas-generating facility and a first exhaust outlet, a second pipeline provided between a second exhaust gas-generating facility and a second exhaust outlet, and a separation unit in communication with the first pipeline and the second pipeline, the separation unit having an inlet for receiving exhaust gas from the first pipeline and the second pipeline and an outlet for delivering treated exhaust gas to the first exhaust outlet and the second exhaust outlet, the separation unit including a first vessel having a separation section and a scrubbing section for removing harmful gases from the exhaust gas.

In a second aspect of the present invention there is provided a carbon dioxide separation system for a plurality of exhaust gas streams, the system including: a plurality of discharge pipelines, each of the discharge pipelines delivering exhaust gas from an exhaust generating facility; a separation unit for receiving the exhaust gas from the plurality of discharge pipelines, the carbon dioxide separation unit for removing at least a portion of the carbon dioxide from the exhaust gas to produce a modified exhaust gas, and at least one return pipeline for directing the modified exhaust gas to at least one exhaust gas outlet.

In a third aspect of the present invention there is provided a method for removing carbon dioxide from exhaust gas, the method including: receiving the exhaust gas from a plurality of discharge pipelines, each of the discharge pipelines delivering exhaust gas from an exhaust generating facility, treating the exhaust gas in a separation unit, the separation unit for removing at least a portion of the carbon dioxide from the exhaust gas, and outputting modified exhaust gas from the separation unit, the modified exhaust gas being returned to the exhaust generating facility associated with at least one of the discharge pipelines.

DRAWINGS

The following figures set forth embodiments of the invention in which like reference numerals denote like parts. Embodiments of the invention are illustrated by way of example and not by way of limitation in the accompanying figures.

FIG. 4 is a cross-sectional side view of an inlet of a separation unit of FIG. 3;

FIG. 9 is a cross-sectional side view of a transfer line between the second separation unit and a storage unit.

DETAILED DESCRIPTION OF EMBODIMENTS OF THE INVENTION

Figure 1:
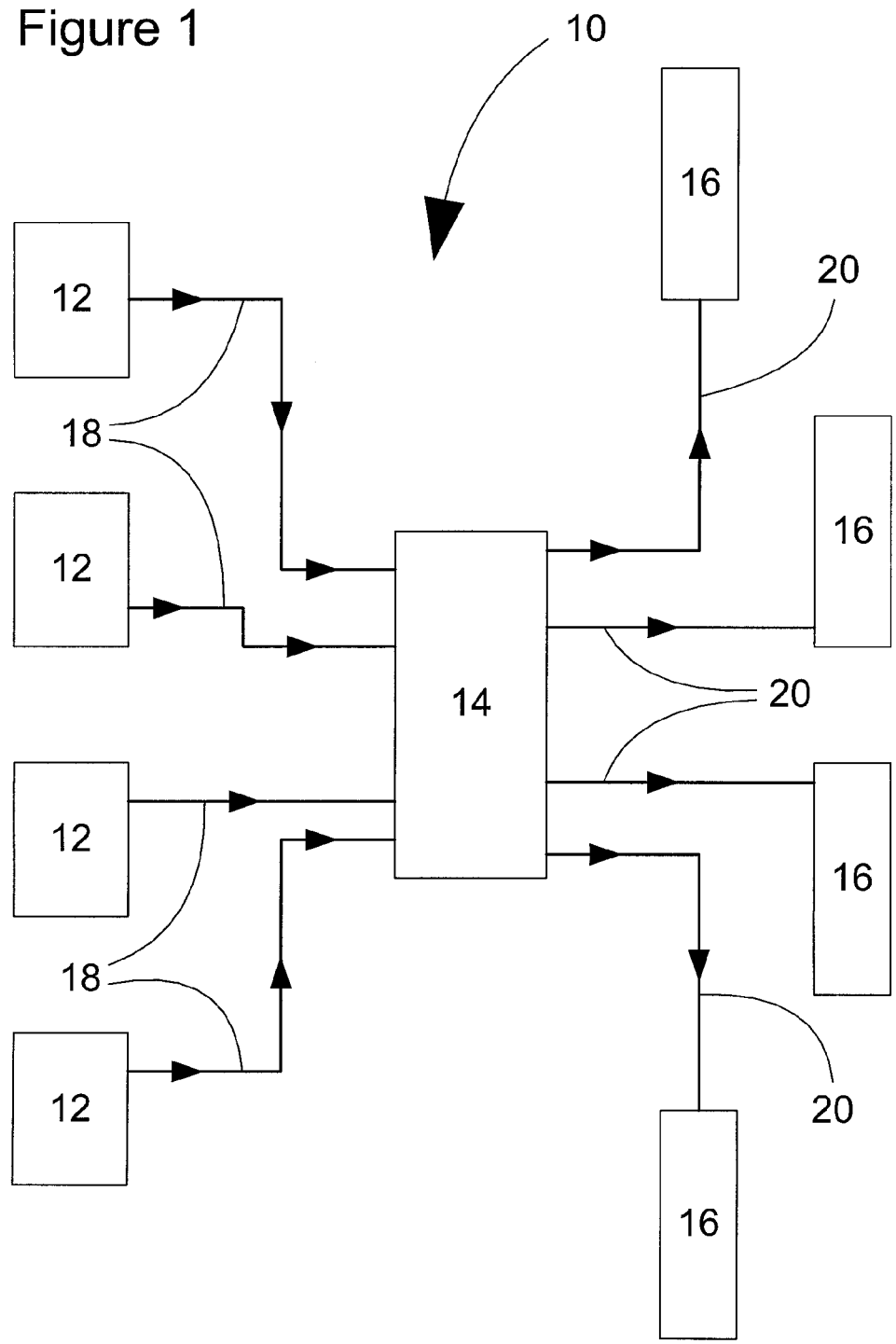
FIG. 1 is a schematic diagram of a separation system according to an embodiment of the present invention.

Referring to FIG. 1, a separation system 10 for a plurality of exhaust streams is generally shown. The separation system 10 includes a plurality of exhaust gas producing facilities 12, a separation unit 14 and a plurality of exhaust stacks 16 for dispersing exhaust gas upward into the atmosphere. Examples of types of exhaust gas producing facilities 12 include: industrial plants, single family dwellings, geological $CO_2$ storage reservoirs, apartment complexes, office complexes, pulp/paper production facilities, stationary internal combustion engines, coal processing plants for production of electricity, waste treatment plants and the like. The exhaust gas producing facilities 12 shown in FIG. 1 are multiple discharge points from a single site. Examples of multiple discharge points include: (1) coal processing plants that generally have a first discharge from crushing and pulverizing operations, a second discharge from heat treatment processes, and a third discharge for steam released from processing ovens. According to the system of the present invention, all these discharge points are fed into and combined into one central line from which the contaminants are separated and scrubbed out. (2) large cement plants also have multiple discharge points as a consequence of the large amounts of fumes and particulates produced by the requisite heat requirements and the physico-chemical processes involving in producing cement products. (3) large oil and gas fields have multiple processing plants situated in close proximities for efficient extraction of crude oil from subterranean reservoirs and/or tar sands. All of the exhaust lines from each of these exemplary systems could be configured into the systems of the present invention for concurrent separation and cleaning of the individual gaseous components comprising the exhaust gas streams and manipulably diverting selected components for further processing while controllably releasing a scrubbed exhaust gas stream into the atmosphere. However, it will be appreciated by a person skilled in the art that each of the exhaust gas producing facilities 12 may be a single discharge point from a different site. The different sites may be separated by distances from one another.

Entry pipelines 18 are provided between each of the exhaust gas producing facilities 12 and the separation unit 14. The entry pipelines 18 direct untreated exhaust gases from the facility 12 to the separation unit 14. Exit pipelines 20 are provided between the separation unit 14 and each of the stacks 16 to direct treated exhaust gases from the separation unit 14 to the stacks 16 to expel the treated exhaust gases into the atmosphere. The stacks 16 may be located adjacent to the corresponding facility 12 or alternatively may be located at a location that is remote from the facility 12.

Figure 2:
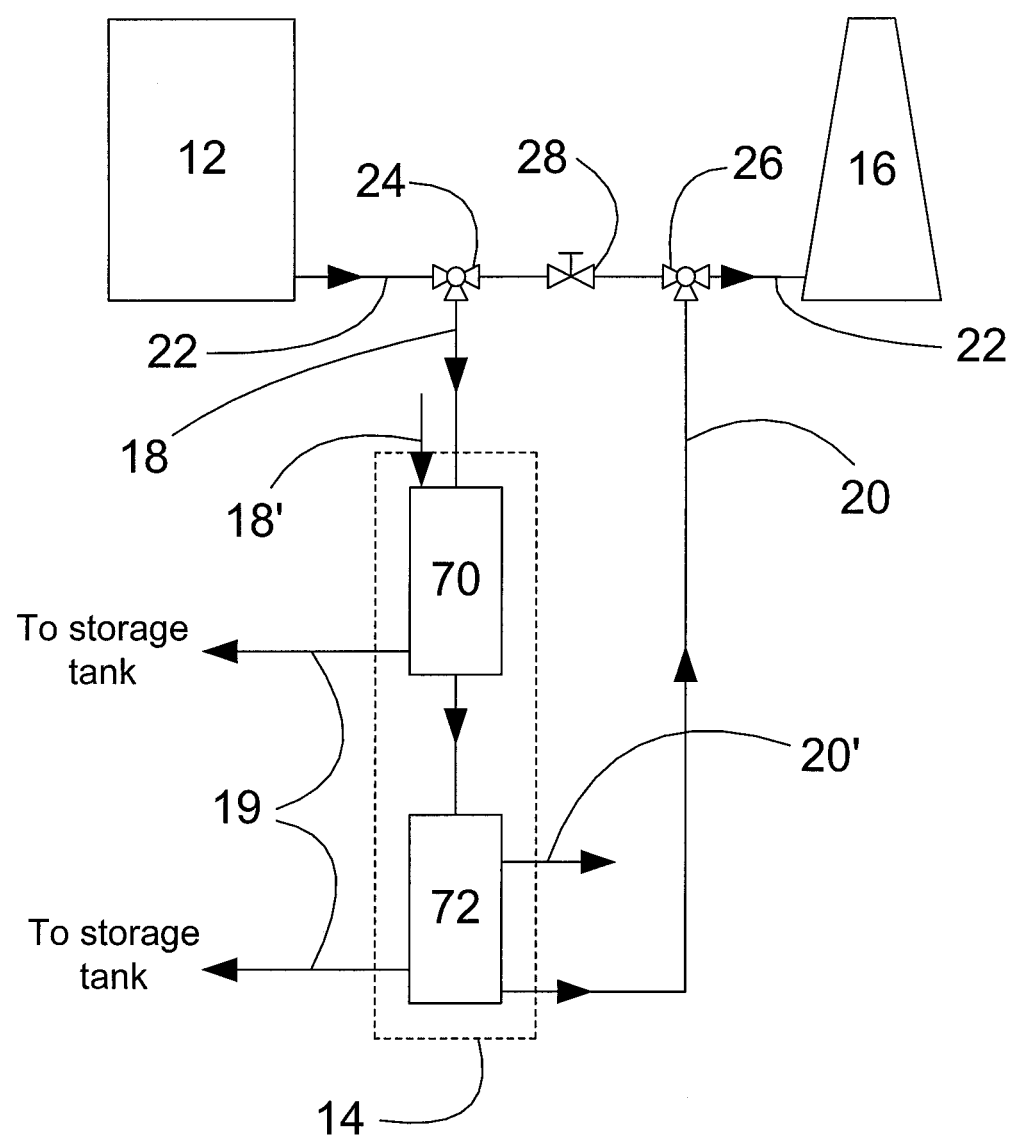
FIG. 2 is a plan view of a portion of the separation system of FIG. 1.

Referring now to FIG. 2, a facility 12 and corresponding stack 16 of the separation system 10 of FIG. 1 is shown. Separation system 10 optionally may include at least one additional facility, which is indicated by entry pipeline 18' and exit pipeline 20', as shown.

Facility 12 includes a bypass pipeline 22, which provides a direct link to the stack 16. A first valve 24 is located between the bypass pipeline 22 and the entry pipeline 18 at the entrance to the entry pipeline 18. Similarly, a second valve 26 is located between the bypass pipeline 22 and the exit pipeline 20 at the exit of the exit pipeline 20. An additional valve 28 is provided in the bypass pipeline 22 and is spaced between the respective intersections between the bypass pipeline 22 and the entry pipeline 18 and the bypass pipeline 22 and the exit pipeline 20. Valve 28 diverts untreated gas to the separation facility and segregates the treated gas entering bypass pipeline 22 and exhausting up stack 16. Typically, during operation of the separation unit 14, valves 24 and 26 are in an open position and valve 28 is in a closed position in order to allow exhaust gas to be directed toward the separation unit 14 before being returned to the stack 16 and expelled into the atmosphere. In situations where maintenance and repair are required on separation unit 14, then valves 24 and 26 would be closed while valve 28 is open to divert all exhaust gas produced from the facility 12 to the stack 16. It is also a safety feature. When maintenance and/or repair work is being performed on separation unit 14, any harmful gases emanating from the separation unit 14 can be purged, while the exhaust gases produced from the facility 12 are routed through pipeline 22 to stack 16.

Figure 3:
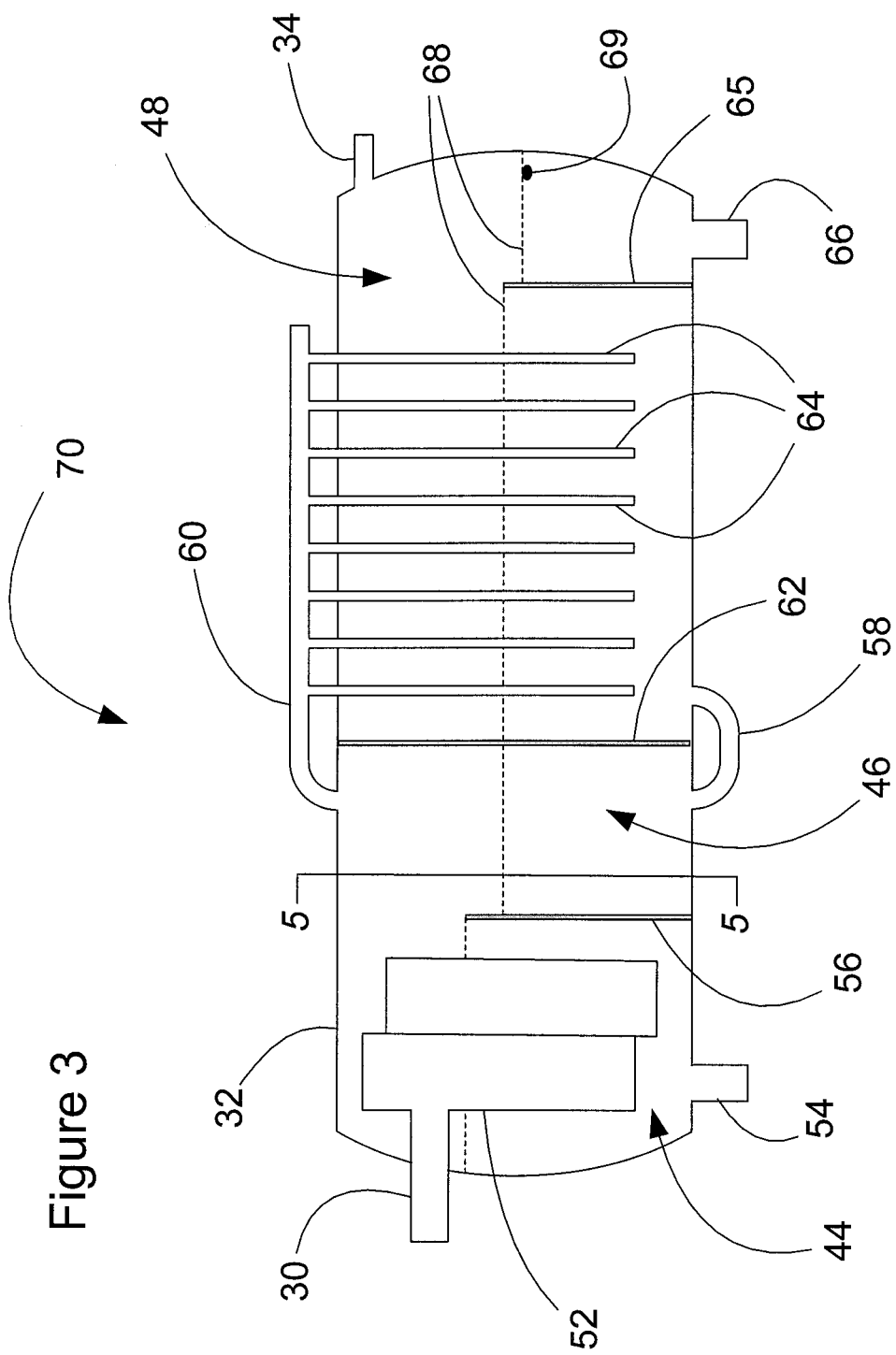
FIG. 3 is a cross-sectional side view of a first separation unit from FIG. 2.

Referring to FIGS. 2 and 3, the separation unit 14 generally includes a first vessel 70 and a second vessel 72. The first vessel 70 includes an inlet pipeline 30, a separation tank 32 and an outlet 34. The separation tank 32 is generally divided into three different sections: a first separation section 44, a second separation section 46 and a scrubbing section 48.

In general, the first treatment vessel 70 separates $CO_2$ gas from the exhaust gas and the second treatment vessel 72 treats the $CO_2$ gas using algal photosynthesis to produce glucose. In addition, treatment vessels 70 and 72 step-down the pressure of the exhaust gas stream flow to slightly above one atmosphere. The separation unit 14 is customizable for each individual application. Depending on the composition of the exhaust gas being emitted from a particular facility 12, different separation and scrubbing processes will be performed. The separation unit 14 described herein is provided to treat exhaust gases containing $CO_2$, $NO_x$, $SO_2$, mercury and sub micron particles of dust and/or minerals and/or ash.

Figure 6:
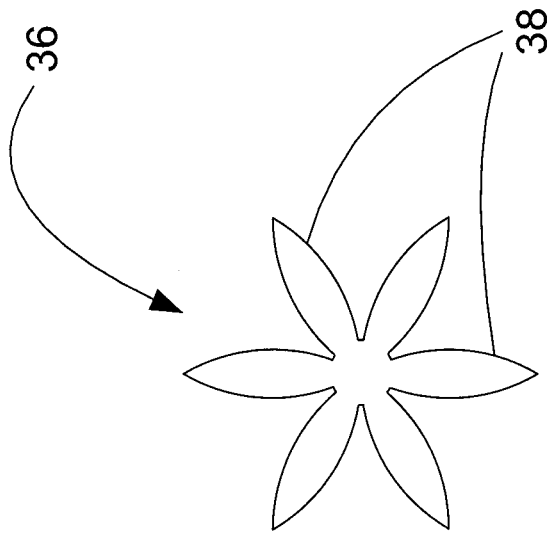
FIG. 6 is a view on 6-6 of portions of FIG. 4.

The inlet pipeline 30 is coupled to the entry pipeline 18 to receive the exhaust stream therefrom. The inlet pipeline 30 includes at least one fan 36, shown in FIG. 6, having multiple spiraling vortex blades 38. Suitable fans are exemplified by the Porta-Test Whirly Scrub. The fan 36 exerts a centrifugal force on the entering exhaust stream in order to accelerate the exhaust stream by vortexing centrifugal force through the inlet pipeline 30. The fan-driven acceleration and vortexing of the exhaust gases significantly increases the intermixing of the gases with fluids injected into the pipeline and with the liquids resident in the first treatment tank 70 (to be described in more detail in a later section).

A treatment inlet 40 is provided in the inlet pipeline 30 slightly downstream of the fan 36 in order to receive an injection of a fluid for treating the exhaust gas (FIG. 4). Examples of fluids that may be injected into the inlet pipeline 30 include: algae-laden water and liquefied ammonia. The centrifugal force generated by the fan 36 upon the exhaust gas facilitates mixture of the exhaust gas with the injected fluid to produce slurries.

A nozzle including at least one diffuser (not shown) is provided at the end of the inlet pipeline 30 to spray the slurry into the first separation section 44. The first separation section of the tank 32 is the "dirty" or sludge section where sludge from particles is separated and shipped to a separate holding tank from where it is transferred for further refining or alternatively, disposal. Clean fluid rises in the first separation section 44 of the tank 32 and sludge exits the tank 32 through sludge outlet 54. The clean fluid, is generally a combination of ammonium bicarbonate, sulfate and nitrate salts (fertilizer). It is optional that a portion of these fertilizers may be used in the latter stage of this process to promote more rapid algae growth rate (nutrients).

Figure 5:
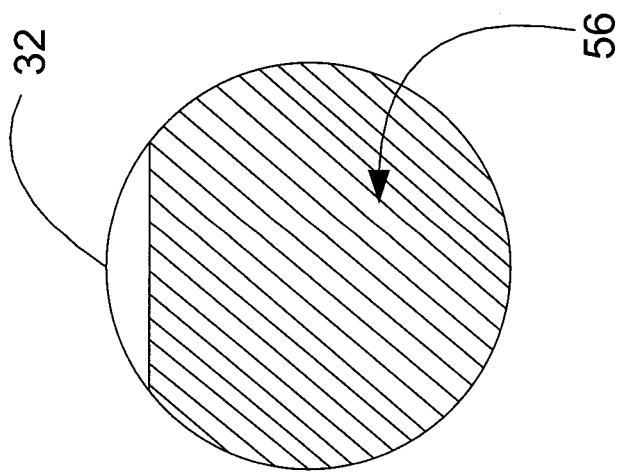
FIG. 5 is a view on 5-5 of portions of FIG. 3.

A weir 56, which is shown in FIG. 5, is provided between the first separation section 44 and the second separation section 46. The weir 56 is sized to allow the clean fluid from the first separation section 44 to flow into the second separation section 46. The clean fluid exits the second separation section 46 through a clean fluid outlet 58 and is transferred to the third separation section 48.

The remaining $CO_2$, $NO_x$, $SO_2$ gases are diverted from the first and second separation sections 44, 46 into the scrubbing section 48 through pipeline 60. The scrubbing section 48 is filled with a bath of liquefied ammonia. A seal 62 is provided between the second separation section 46 and the scrubbing section 48 in order to restrict fluid flow therebetween. The combined gases are expelled through multiple nozzles 64 into the scrubbing section 48. Scrubbing Section 48 will have a weir 65 approximately one quarter distance in from end vertical end cap. The spill-over point of said weir 65 from scrubber 48 will be approximately 2 feet above the level controller 69. The level controller 69 will be positioned slightly to the side of the weir 65. The purpose of the weir 65 is to provide a quieter area (i.e., of less turbulence) just below gas outlet 34. There may be need to partially box in level controller 69 in order for its displacer (float) assembly (not shown) to be out of any turbulence from down rushing fluid. As shown in FIG. 3, the nozzles 64 are distributed over the length of the scrubbing section 48 almost to the bottom of the tank 32 to inject the combined gases into the bath of liquefied ammonia. The slurry, which generally includes salts, from the scrubbing section 48 exits the tank 32 though slurry exit 66. Once the slurry exits the tank 32, it is shipped to a storage tank.

A pipeline 130 (not shown but similar in design to pipeline 30 shown in FIG. 4) is provided for the transfer of gases between the first and second treatment tanks 70, 72. Pipeline 130 is configured at one end to sealingly interconnect with gas outlet 34 provided in first treatment tank 70, and the other end to sealingly interconnect with inlet 132 in the second treatment tank 72. The fluid injected into pipline 130 is algae-laden water. The injected algal water and $C0_2$ will be intensely mixed with the vortex created in pipeline 130 by fans 36. It is optional to imbed lights into a mixing apparatus running the length of pipeline 130 to enhance the intermixing and commingling of the algal water, mixing and contact of the algal water and gases emanating from the first treatment tank 70, as well as initiating photosynthetic activity by the algal cells.

Figure 7:
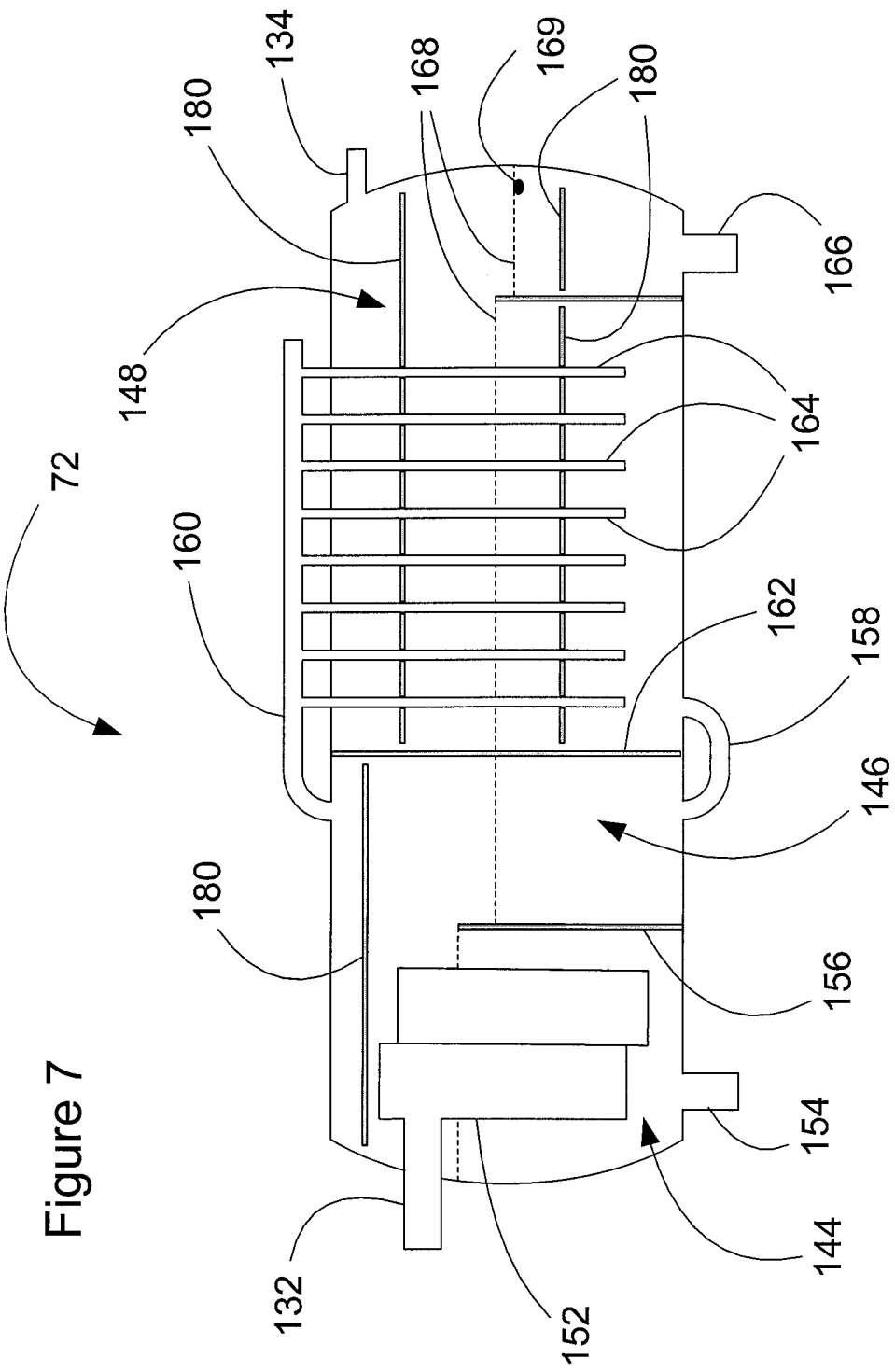
FIG. 7 is a cross-sectional side view of a second separation unit from FIG. 2.
Figure 8:
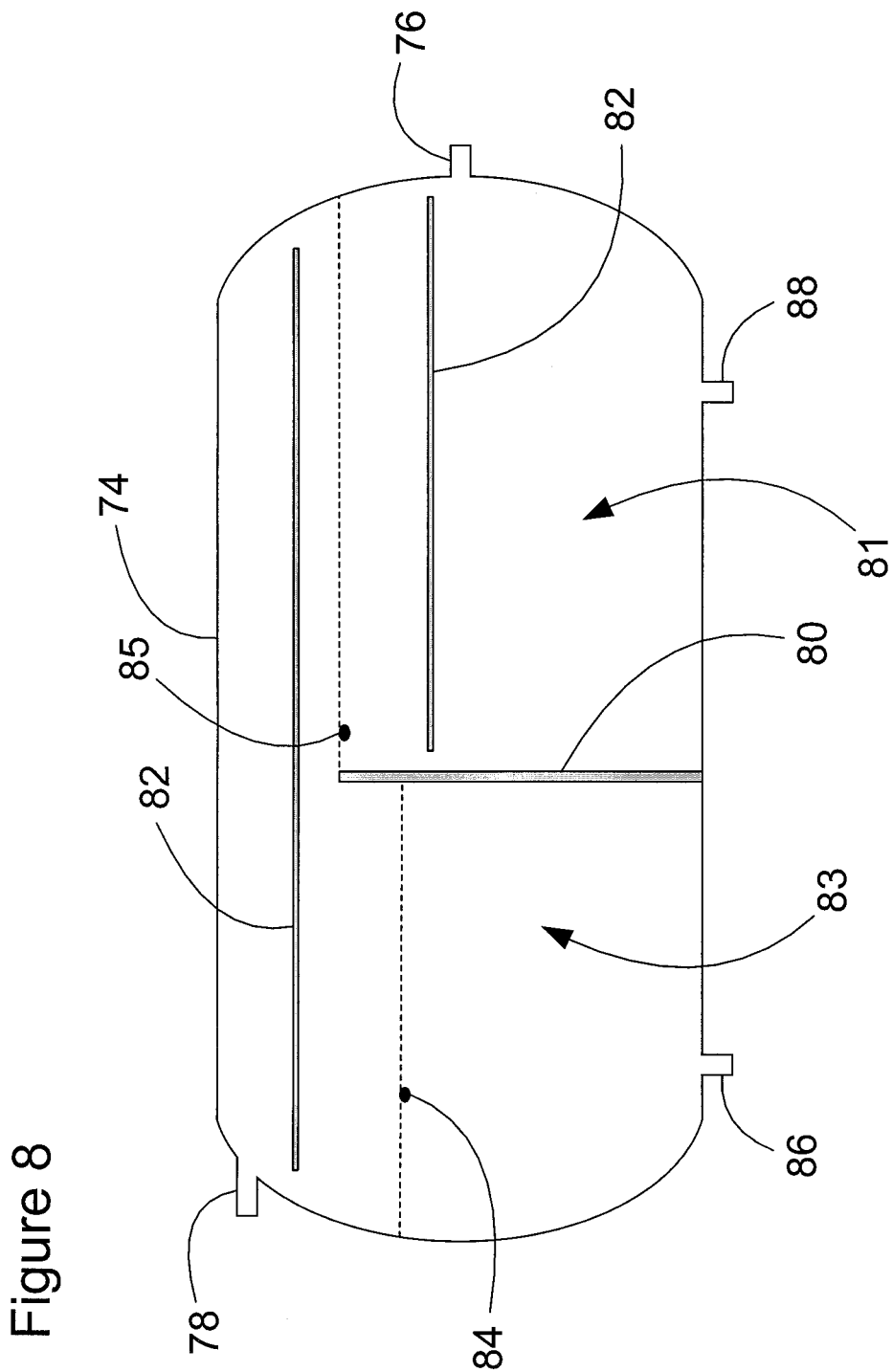
FIG. 8 is a cross-sectional side view of a storage tank for use with the separation system of FIG. 1.

As shown in FIG. 7, the treatment sections 144, 146, 148 of the second treatment vessel 72 will have lighting 180. Section 148 (the scrubbing end) will have lighting 180 on the upper portion and lighting 180 submerged in the bottom portion of the compartment 148, above the nozzles 164. The vessels 70, 72 are generally similar in construction. However, the scrubbing section of vessel 72 is proviced with algae-laden water while vessel 70 is provided with aquafied ammonia. Basically the difference between first and second treatment vessels 70 and 72 is that the section where the aqueous ammonia is coming out of scrubber section of tank 70, on tank 72 this will be algae laden water out. The clean fluid out of the front section (the separation end) will be tied into the bottom of the scrubber section on both 70 and 72. With this design, there will be a constant circulating (closed loop system) of the algae laden water and captured $CO_2$. The nozzles 64, 164 about the bottom of the scrubber sections in both tanks 70, 72 will also act to provide agitation to aid in the circulation. The exhaust gas outlet 134 of vessel 72 will be at the top centre of end cap. When the system is up and running for a few days (i.e., when the algae is growing and multiplying at peak performance) the only gas released to stack 16 should be $O_2$ plus a few other inert gasses. The $O_2$ can be passed through a membrane (not shown) where it can then be recovered, collected and used for other purposes. The algal $CO_2$-laden water will be shipped from Vessel 72 via pipeline 19 (FIG. 9) to a storage tank (FIG. 8). This particular pipeline 19 will be provided with fans 36 for creating vortex and with lighting elements along the substantially most of the length of the pipeline to the storage tank. A suitable pipeline is exemplified by an auger-type system provided with imbedded lighting for enabling continued algal photosynthesis. It should also be noted that first and second treatment vessels 70, 72 will be operating at slightly above 1 atmosphere with the pressure in separation end slightly higher than in scrubber end and the pressure in vessel 70 being slightly higher than the pressure in vessel 72.

Referring back to FIG. 2, the separation unit 14 includes a first vessel 70 and a second vessel 72. The vessels 70, 72 are generally similar in construction. However, the bath in the scrubbing section is algae-laden water rather than liquefied ammonia, plus vessel 72 is provided with internal UV lighting. The vessels 70, 72 are provided in tandem such that the $CO_2$ gas that exits the first vessel 70 enters the second vessel 72.

Similar to the exhaust gas that enters first vessel 70, the $CO_2$ gas is first subjected to a centrifugal force, then mixed with a fluid. In the second vessel 72, the fluid is water containing a chlorophyll active material. A light source (not shown), such as a laser or light emitting optical fibers, for example, is directed along the length of the flowline to excite the $CO_2$ content and promote photochemical reactions. The primary product of this reaction is glucose, which is shipped to storage.

Referring to FIG. 8, a storage tank 74 is generally shown. More than one storage tank 74 is provided in order to house the different byproducts of the separation process. The storage tanks 74 for the different byproducts are generally similar and therefore a single storage tank 74 for use with different byproducts will be described. The storage tank 74 includes an inlet 76 for receiving a fluid from the separation process into a first section 81 and a gas outlet 78. The slurry from Vessel 72 will enter the storage tank 74 at Inlet 76. There may be lighting 82 provided along the entire upper length of storage tank 74. A level controller 85 will be just below the top of the weir 80 on the inlet side i.e., first section 81. The level controller 85 will establish a level between the algae-laden water below and the rapidly growing algae on surface in contact with light sources. (Light will not penetrate more than the top 3 or 4 inches because of the density.) There will also be lighting 82 just under this layer to enhance growth from the underside of this layer. This lighting will run from inlet 76 to weir 80. As algae grow and expand, this layer will flow over the weir 80 into the second section 83 where it will continue its growth and eventually be transferred for further processing. The level controller 84 will maintain the fluid level in second section 83 and also control a dump valve (not show) provided for controllably releasing fluid through outlet 86 for transfer to a holding tank (not shown) from where, this fluid will then be pumped back through the system again. Fresh algae will be periodically added to the holding tank. As time progresses the entire separation system will improve with the increased algae growth. A weir 80 is provided in the storage tank 74. In addition, a light source 82, such as a laser or light emitting optical fibers, for example, is directed along the length of the storage tank 74. In another embodiment, the light source is omitted. It is within the scope of the present invention to provide a series of interconnected storage tanks and holding tanks to handle fluctuation in throughput volumes of exhaust gases and to eliminate $CO_2$ flashing from the gas outlets of the first and second treatment vessels 70, 72, and also storage tanks 74.

The separation unit 14 further includes a holding system for the algae-laden water and a holding system for the water. Pumps (not shown) are provided to allow these fluids to be pumped to different points in the separation unit 14.

In another embodiment, the multiple stacks 16 of FIG. 1 are replaced with a single stack that is provided at the separation unit site 14.

Specific embodiments have been shown and described herein. However, modifications and variations may occur to those skilled in the art. All such modifications and variations are believed to be within the scope and sphere of the present invention.

REBRYNA-COOKSON FIGURE LEGEND 10 separation system
12 exhaust gas producing facilities
14 separation unit
16 exhaust stack
18 entry pipeline
18' entry pipeline from additional exhaust gas producing facilities
19 pipeline to storage tank
20 exit pipeline
20' additional exit pipeline
22 bypass pipeline
24 3-way valve
26 3-way valve
28 2-way valve
30 inlet pipeline
32 separation tank
34 outlet
36 fan
38 vortex blade
40 treatment inlet
41 inline separator
43 aqueous ammonia mist
44 first separation section 46 second separation section
48 scrubbing section
50
52 diffuser
54 sludge outlet
56 weir
58 clean fluid transfer line
60 pipeline
62 seal
64 multiple nozzles
65 weir
66 slurry outlet to storage tank
68 reference level
69 level controller
70 first treatment vessel
72 second treatment vessel
74 storage tank
76 inlet
78 exhaust outlet
80 weir
81 first section
82 lighting
83 second section
84 level controller
85 level controller
86 algal outlet to storage
88 fluid outlet to storage
130 inlet (not shown)
132 inlet to tank 72
134 outlet
144 first separation section
146 second separation section
148 scrubbing section
150
152 diffuser
154 sludge outlet
156 weir
158 clean fluid transfer line
160 pipeline
162 seal
164 multiple nozzles
166 slurry exit
168 reference level
169 level controller
180 lighting

The invention claimed is:

1. A separation and scrubbing system comprising:
a first pipeline provided between a first exhaust gas-generating facility and a first exhaust outlet;
a second pipeline provided between a second exhaust gas-generating facility and a second exhaust outlet; and
a separation unit in communication with said first pipeline and said second pipeline, said separation unit having an inlet for receiving exhaust gas from said first pipeline and said second pipeline and an outlet for delivering treated exhaust gas to said first exhaust outlet and said second exhaust outlet, said separation unit including a first vessel having a separation section and a scrubbing section for removing harmful gases from said exhaust gas.

2. A system as claimed in claim 1, wherein said harmful gases are selected from the group consisting of: $CO_2$, $NO_x$ and $SO_2$.

3. A system as claimed in claim 1, wherein said separation unit includes said first vessel and a second vessel, said second vessel including a second separation section and a second scrubbing section.

4. A system as claimed in claim 3, wherein said first vessel and said second vessel are provided in series.

5. A system as claimed in claim 1, wherein said separation unit is in communication with multiple pipelines to remove carbon dioxide from exhaust gas produced by multiple gas-generated facilities.

6. A system as claimed in claim 1, wherein said separation section of said first vessel includes a first separation section and a second separation section, a weir being provided between said first separation section and said second separation section to allow clean fluid from said first separation section to flow into said second separation section.

7. A system as claimed in claim 6, wherein said scrubbing section is filled with liquefied ammonia.

8. A system as claimed in claim 3, wherein said second scrubbing section of said second vessel is filled with algae-laden water.

9. A system as claimed in claim 8, wherein said second vessel is provided with internal UV lighting.

10. A system as claimed in claim 1, wherein said first exhaust gas-generating facility and said second exhaust gas-generating facility are selected from the group consisting of: industrial plants, single family dwellings, geological $CO_2$ storage reservoirs, apartment complexes, office complexes, pulp/paper production facilities, stationary internal combustion engines oil and gas processing plants and coal processing plants.

* * * * *